Oct. 11, 1938.   G. P. STOUT   2,132,447
PROCESS AND APPARATUS FOR INSPECTING FLUIDS
Filed Feb. 5, 1935   12 Sheets-Sheet 3
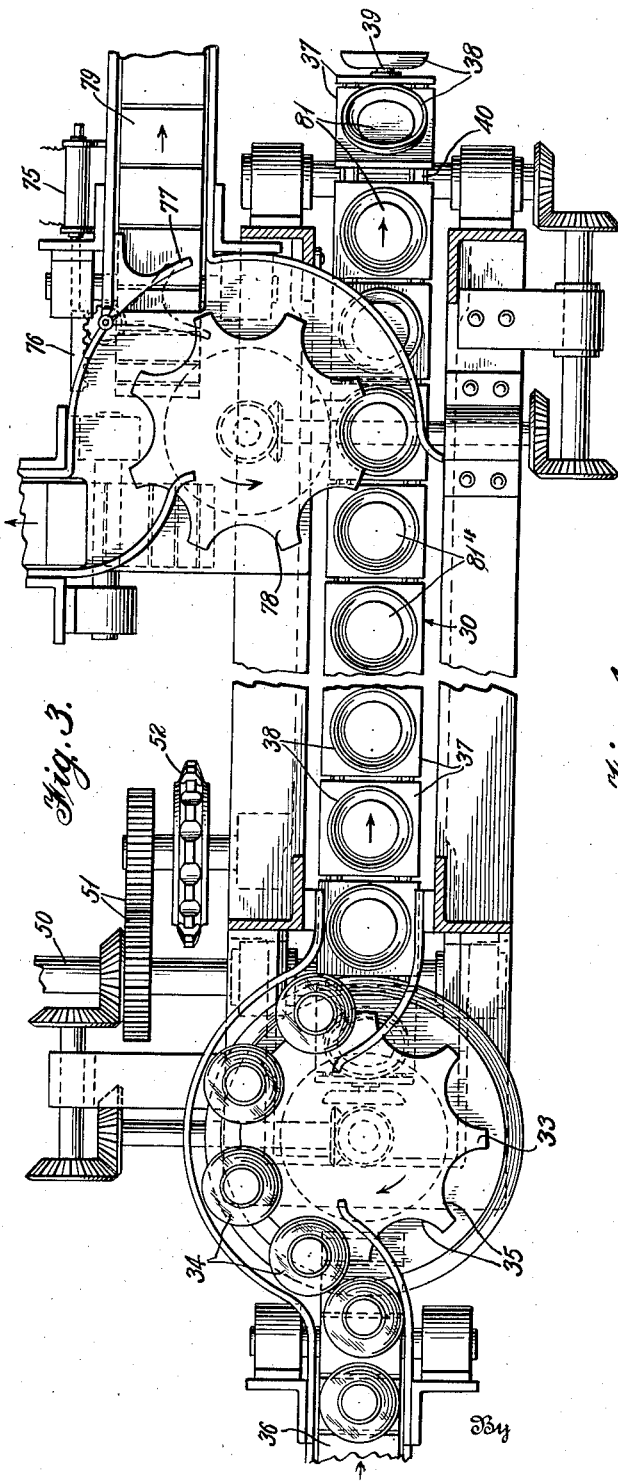
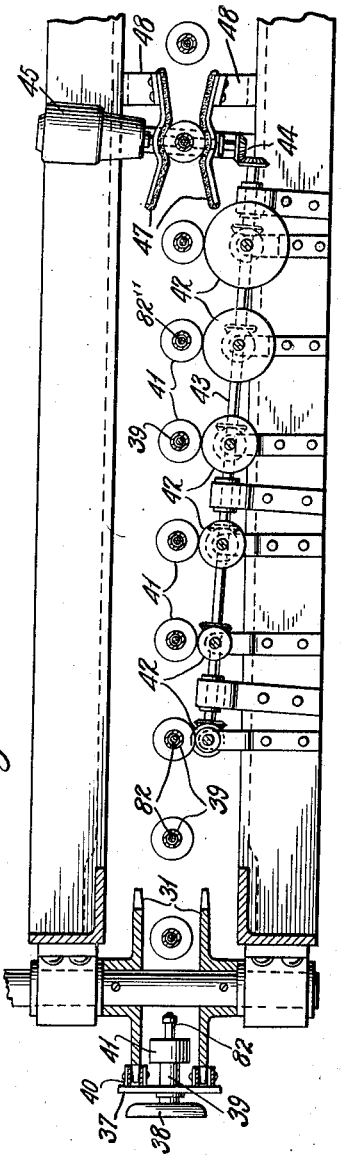
Inventor
George Philip Stout
By Brown & Phelps
Attorneys

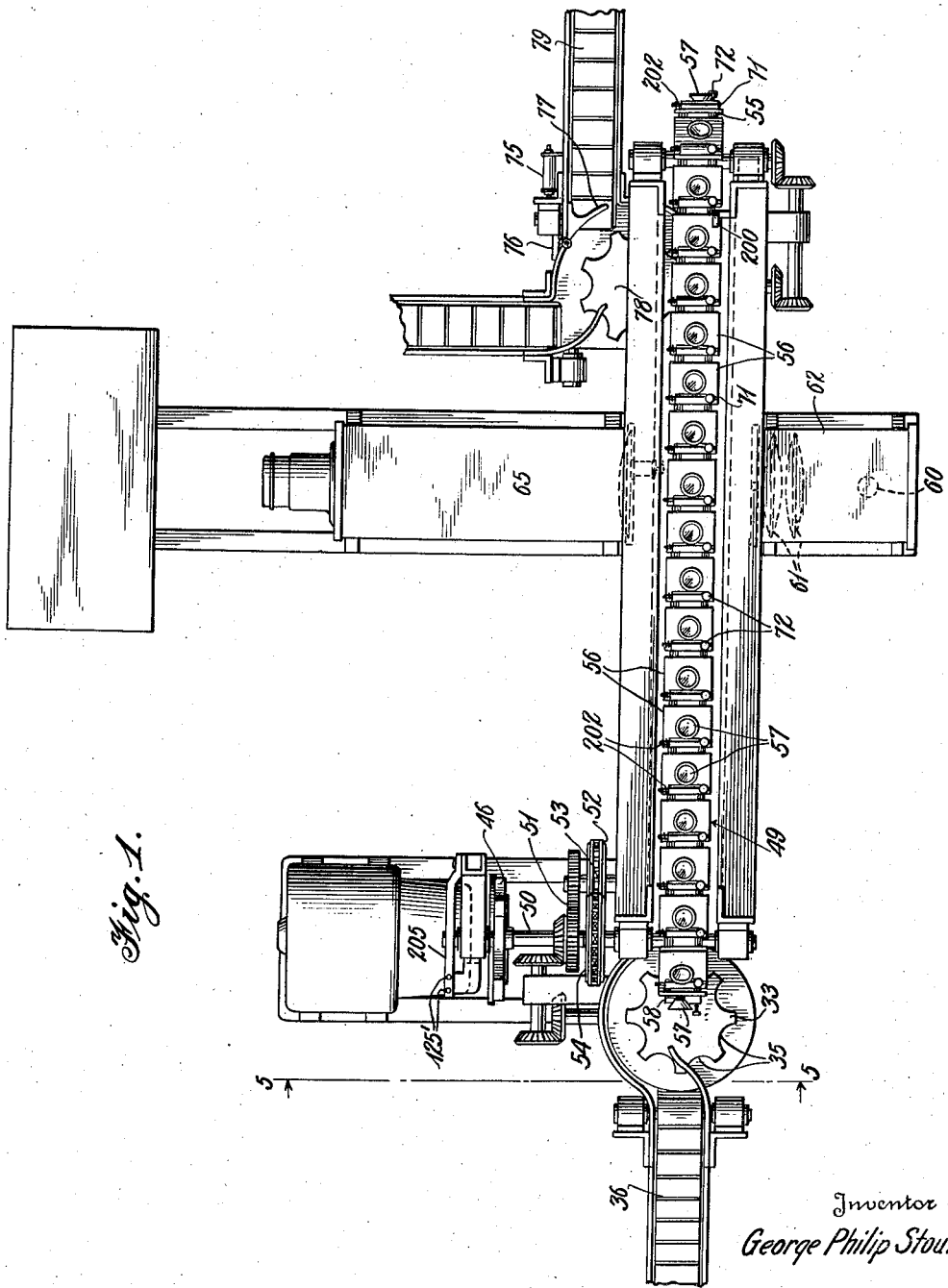

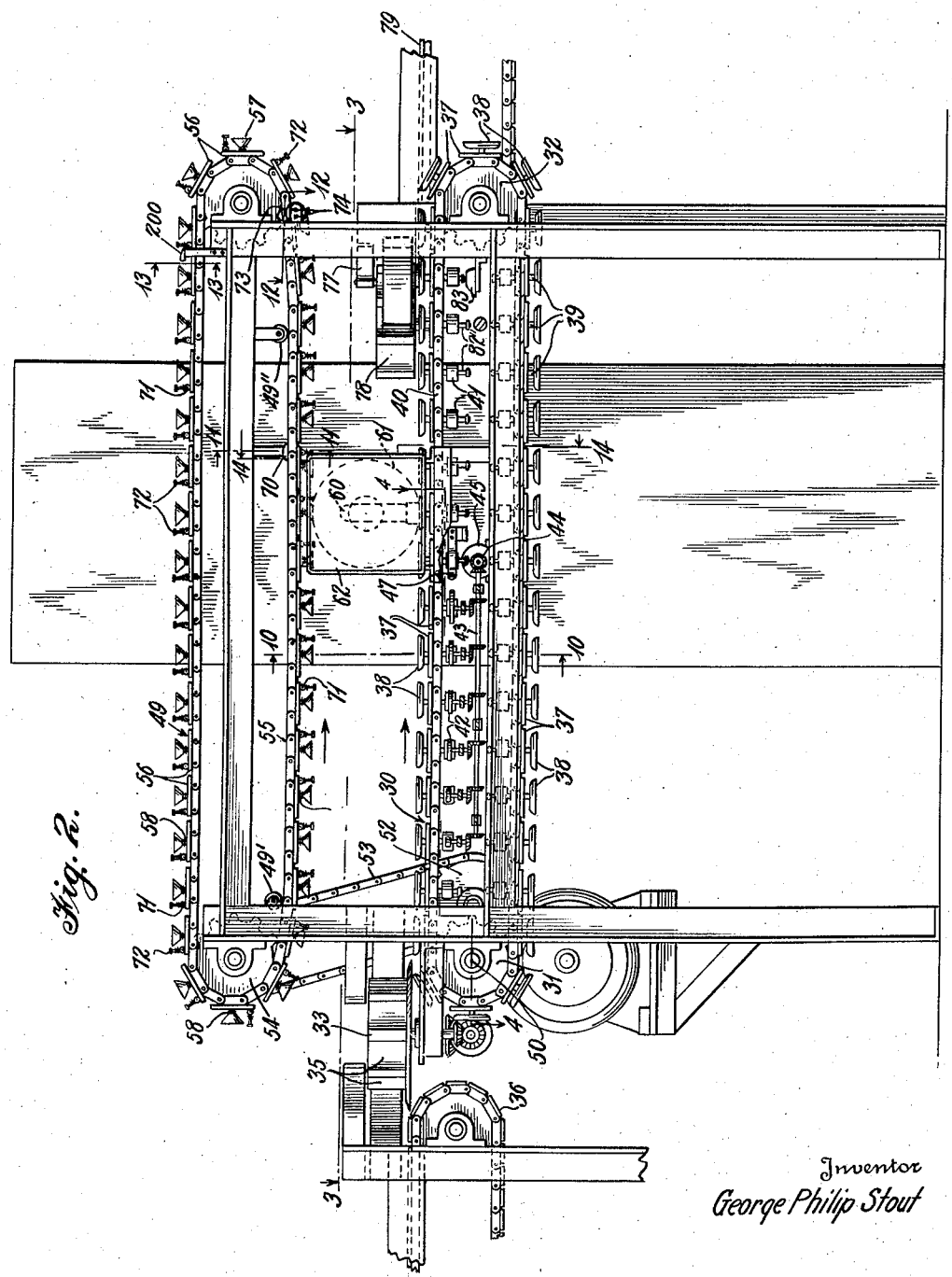

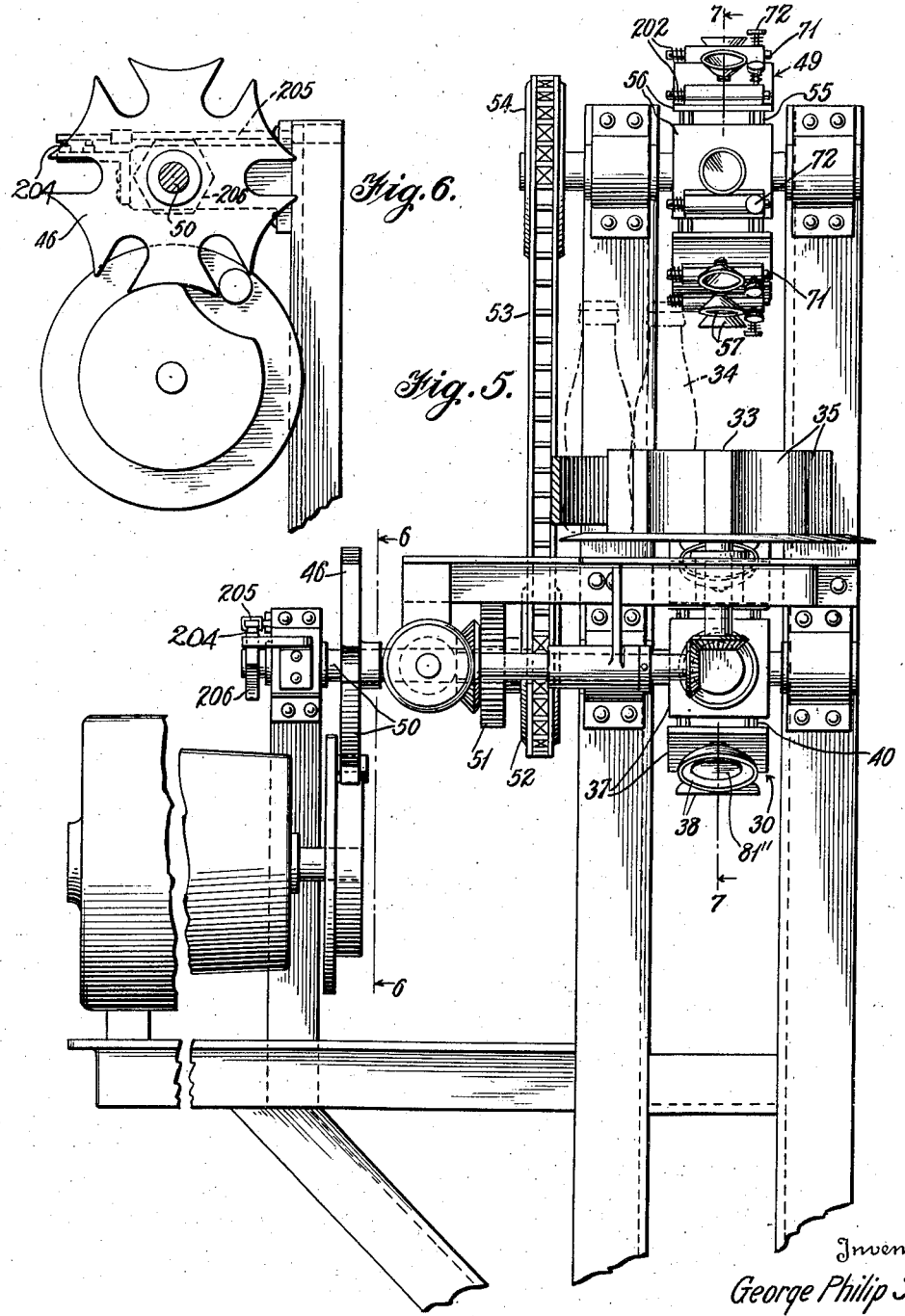

Oct. 11, 1938.  G. P. STOUT  2,132,447

PROCESS AND APPARATUS FOR INSPECTING FLUIDS

Filed Feb. 5, 1935  12 Sheets-Sheet 5

Inventor
George Philip Stout
By Brown & Phelps
Attorneys

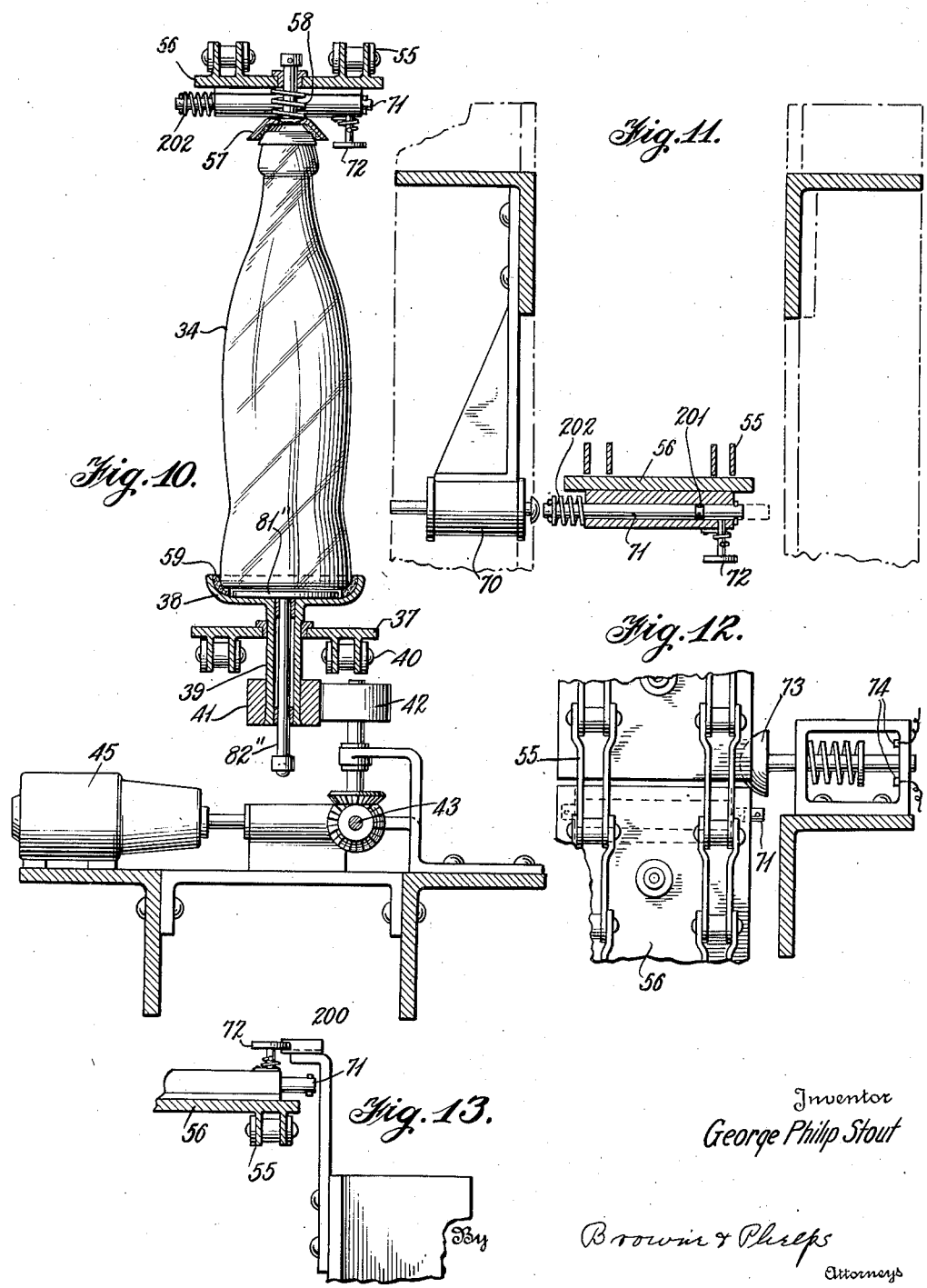

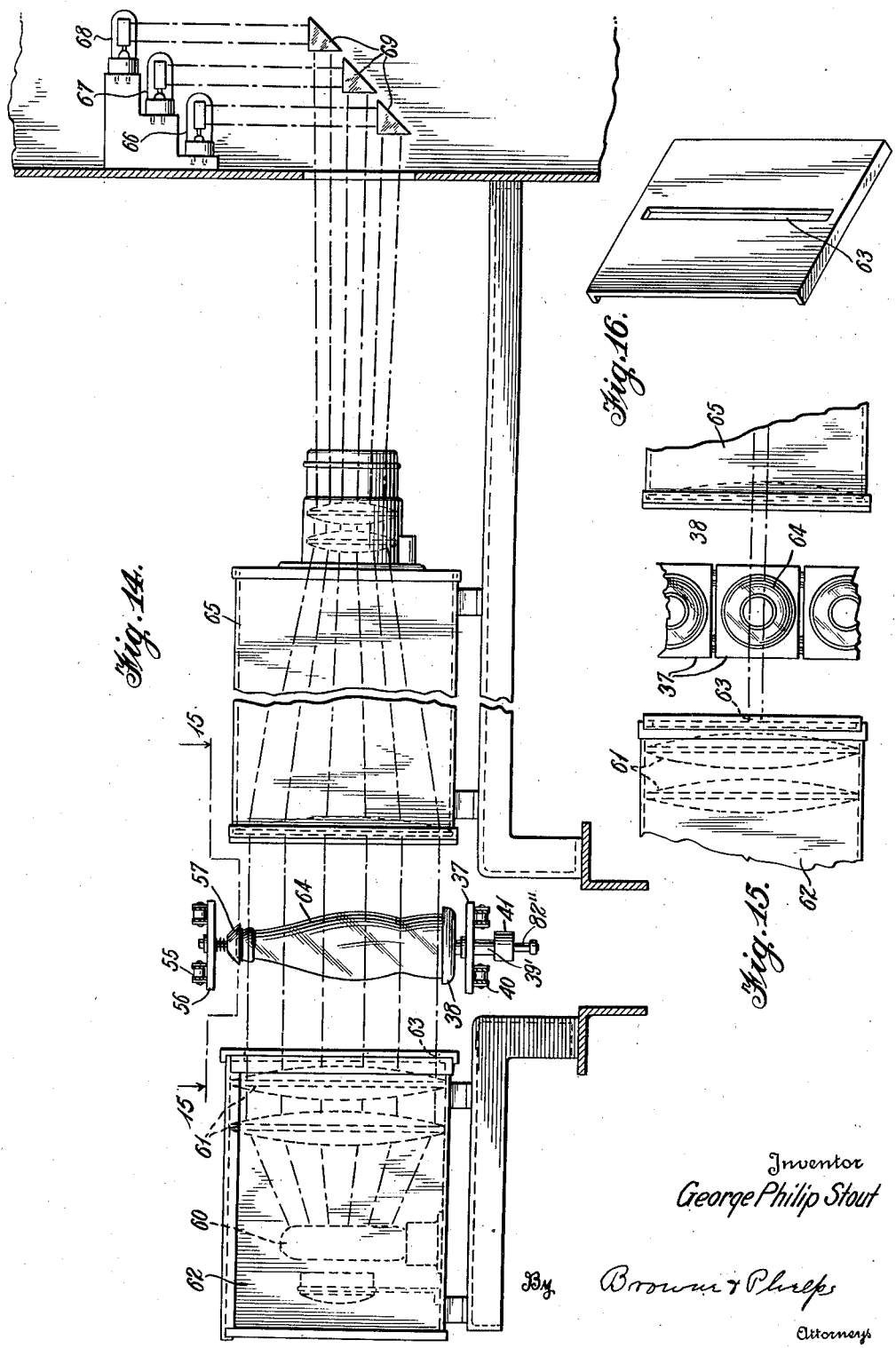

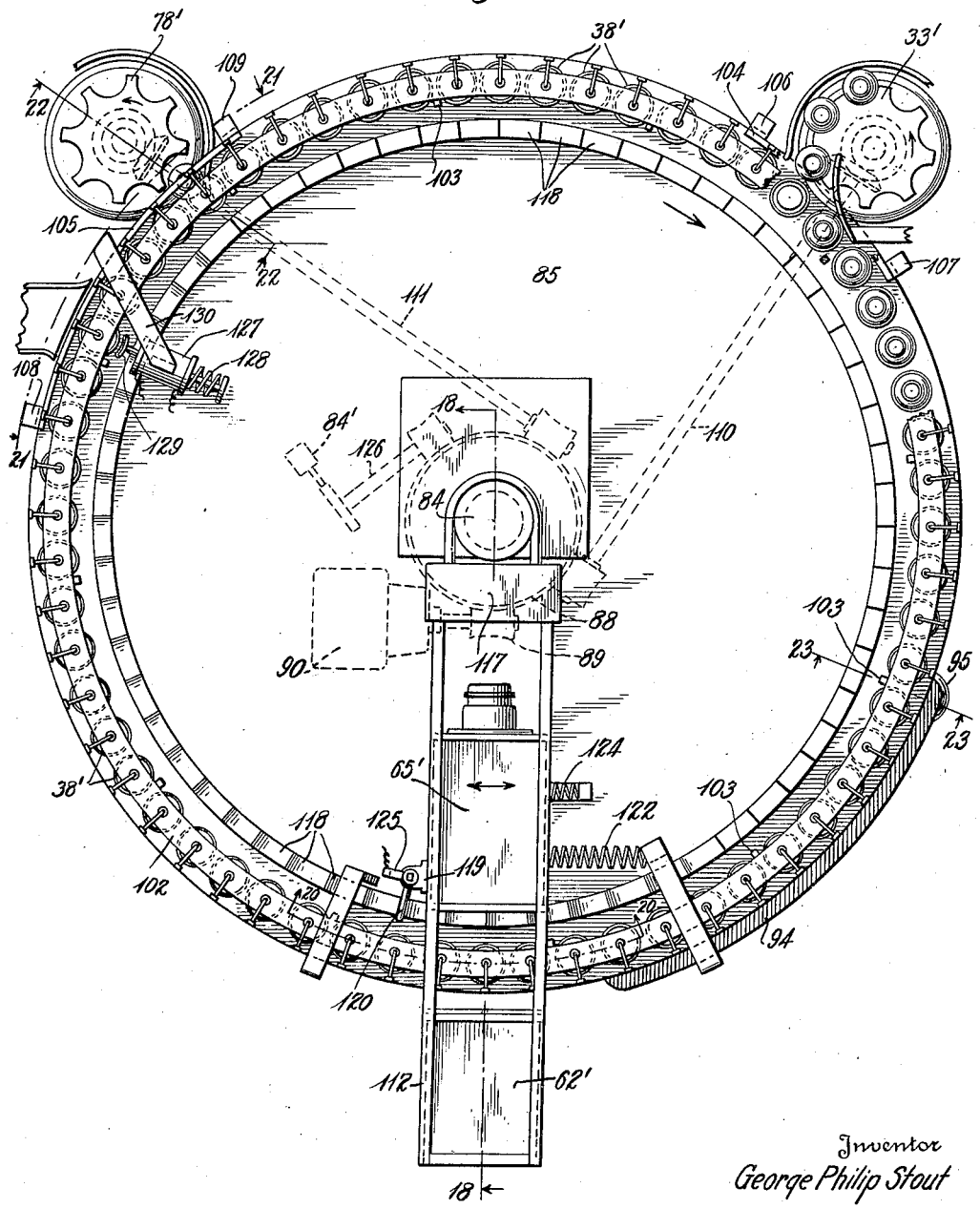

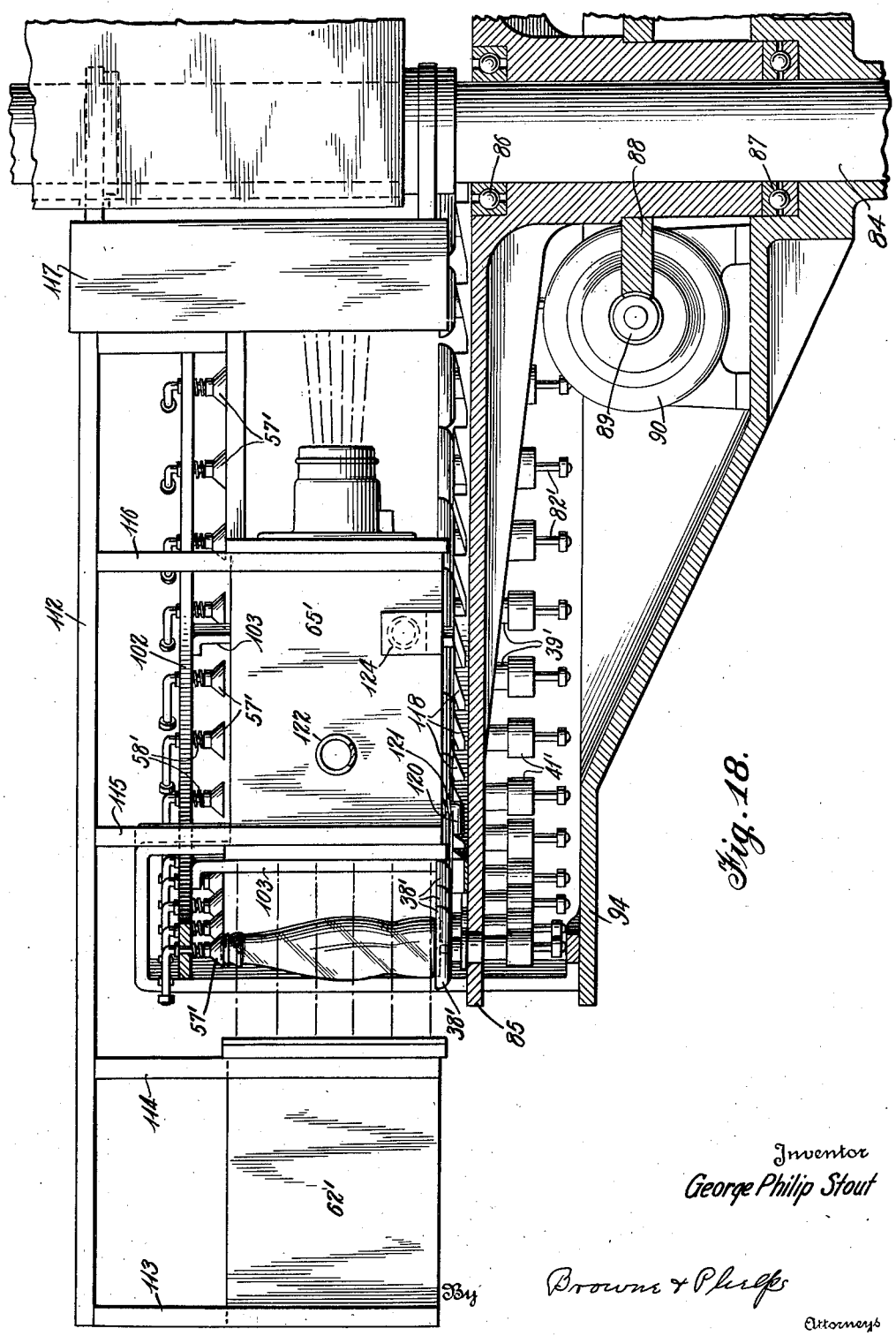

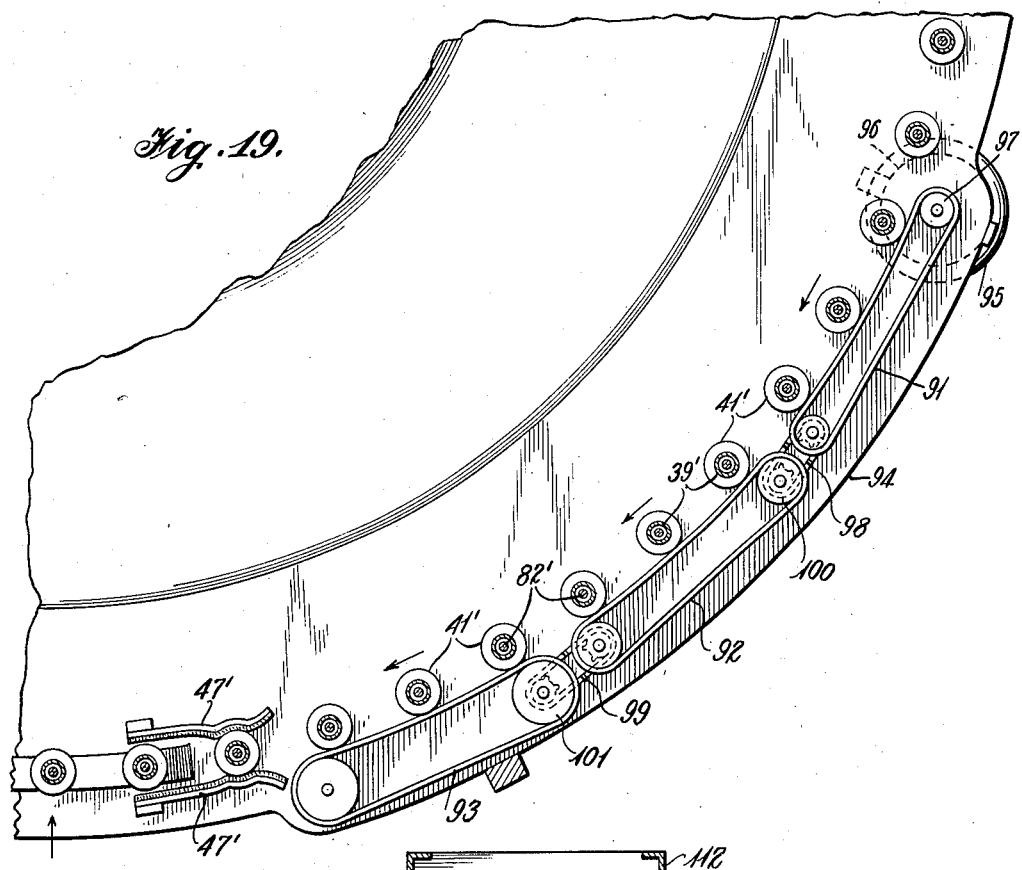
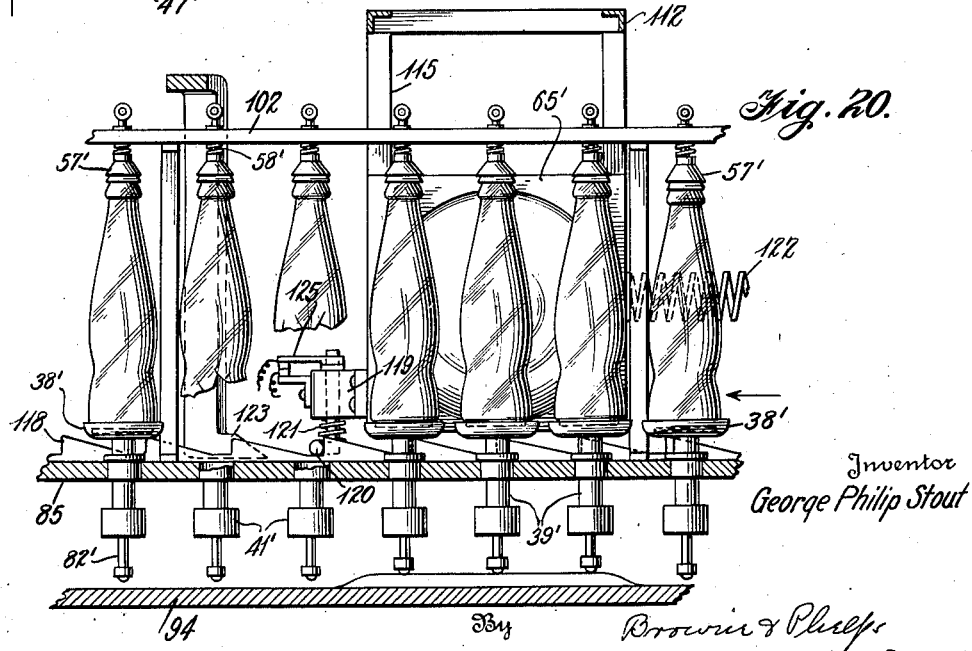

Oct. 11, 1938. G. P. STOUT 2,132,447
PROCESS AND APPARATUS FOR INSPECTING FLUIDS
Filed Feb. 5, 1935  12 Sheets-Sheet 11
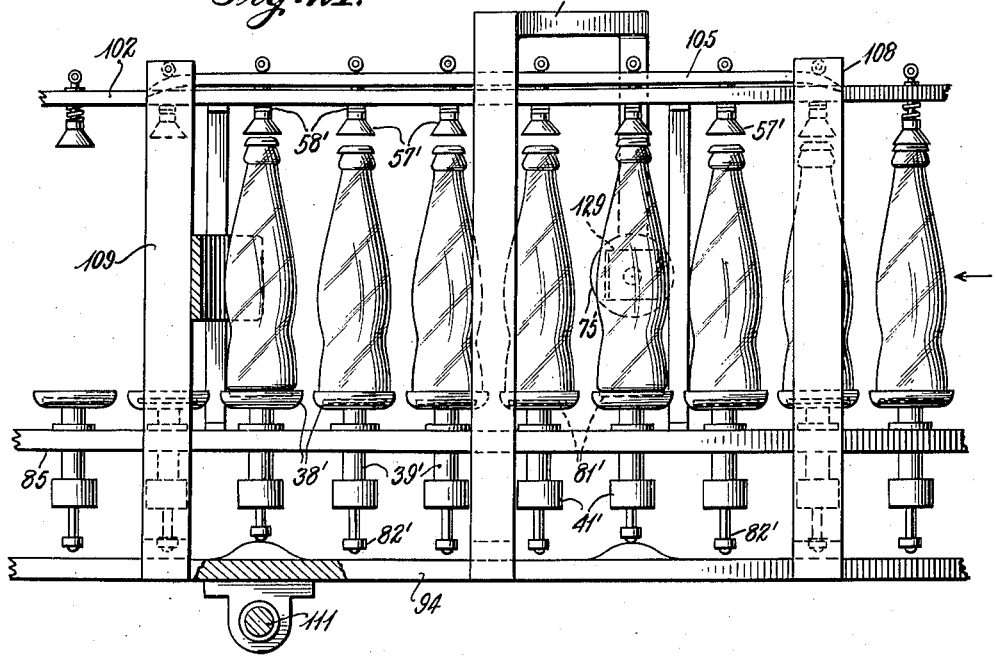
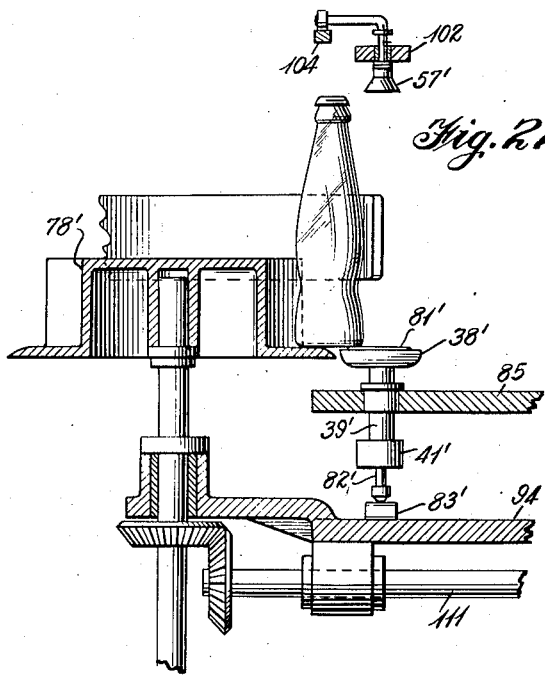
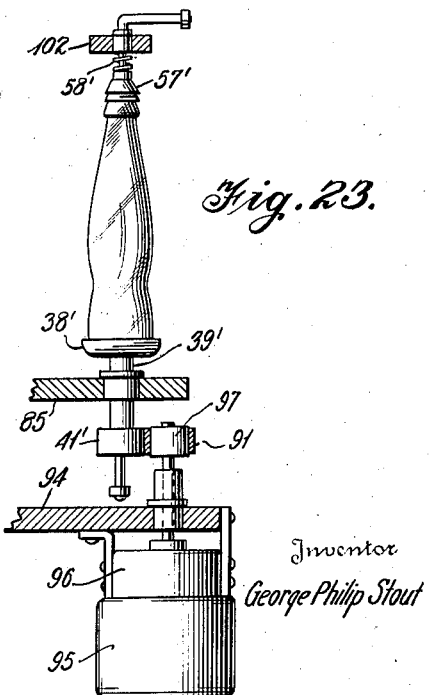
Inventor
George Philip Stout
By Brown & Phelps
Attorneys

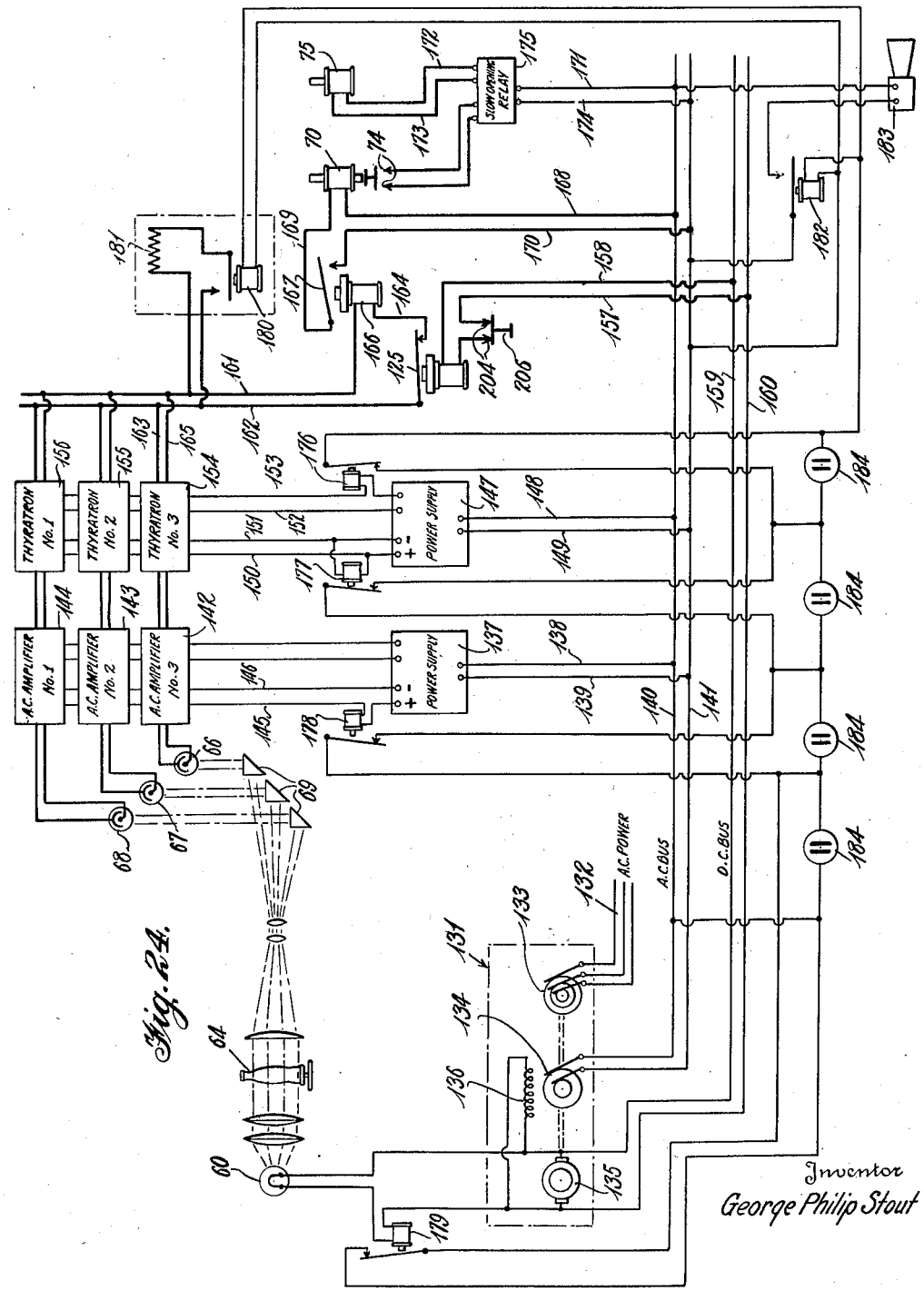

Patented Oct. 11, 1938

2,132,447

UNITED STATES PATENT OFFICE 2,132,447

PROCESS AND APPARATUS FOR INSPECTING FLUIDS

George Philip Stout, Decatur, Ga., assignor, by mesne assignments, to The Coca-Cola Company, Wilmington, Del., a corporation of Delaware Application February 5, 1935, Serial No. 5,143

27 Claims. (Cl. 209—111)

The invention relates to inspection of fluids for detection of foreign bodies therein, and the physical embodiments of apparatus of the invention disclosed for purposes of illustration have particular application to inspection of liquids, more specifically to liquids in packages as bottles, jars or the like.

In the bottled beverage industry it is at present the practice to inspect the bottles manually, after they are capped or "crowned" and ready for distribution to the trade. This is done at present by placing the bottles individually over a source of light and looking through them, a practice which requires the services of a number of operatives to handle the output of a bottling machine. This practice meets the difficulty that the human eye rapidly becomes fatigued and at best is not able to detect small particles, as of glass chipped off in the capping machine, which may cause serious results if imbibed. Failure to detect such foreign bodies has resulted in users bringing heavy claims for damages against the manufacturer.

Devices heretofore proposed for inspection of fluids, generally by the use of radiant energy, so far as known to me, depend upon the direct use of changes in volume of current passing from a photo-electric cell, and therefore are not sensitive to changes caused by foreign particles of the size of a grain of sand, a particle of lint, or a bristle from a bottle-washing brush.

To secure sensitivity, I do not depend upon volumetric changes of the photo-electric current itself but upon electric impulses resulting from abrupt changes in said current, which impulses are amplified to any desired extent and then, in the specific embodiment chosen for illustration, are caused to "break down" the control of a gaseous type of vacuum tube, preferably a triode, the current, which is thereby allowed to flow through the tube, being utilized to indicate the presence of the foreign body.

The method of inspection generally described, depends upon motion of the foreign particle into or out of a beam of radiant energy passing through the material in test. In testing liquids packaged in bottles or jars, the motion of the liquid may be caused by either motion of translation or rotation with respect to the beam. Securing motion in this manner has the defect that a particle of dirt on the container or a chipped spot thereon will cause rejection of a bottle or jar the contents of which is perfect, if the container itself is moved relative to the test beam.

A defect in, or particle on, the container itself will not affect the apparatus of the invention if it is stationary with respect to the beam. I have therefore devised the method of causing the contents to rotate with respect to the container while the container is held stationary relative to the beam while under inspection.

The rotation of the contents of the container may be caused by electrical influence or by mechanical means. Such electrical influence may be brought to bear by placing the container under the influence of a rotating magnetic field as, for instance, in axial alignment with the field of a polyphase motor which has the armature removed. For purposes of illustration, I have chosen to illustrate the mechanical method of causing the rotation of the contents of the container.

It is therefore an object of the invention to provide a process for inspecting fluids for the presence of foreign bodies.

It is a further object of the invention to provide a machine for carrying out the process of the invention.

It is a further object of the invention to provide a machine for inspecting bottled goods, as beverages, and to reject any bottles found to contain foreign material.

It is a further object of the invention to provide a machine having means to cause liquid in a bottle, jar, or the like to rotate with respect to the container, and to detect foreign bodies moving with the liquid in the container by causing such movement to carry the foreign body into and/or out of a beam of radiant energy, as light, whereby to cause an electrical impulse to be generated by abrupt change in current passing through a photo-electric cell, and to utilize said electrical impulse to cause the machine to function to reject the container in which the foreign body is located.

Further objects of the invention will appear from the following description when read in connection with the accompanying drawings showing illustrative embodiments of the invention, and wherein:—

Figure 1 is a plan view of a testing machine, also showing portions of conveyors which carry to and from the machine the packages to be tested;

Fig. 2 is a side elevation;

Fig. 3 is a detail horizontal section on line 3—3 of Fig. 2, upon an enlarged scale and broken away to show only the input and output to the machine;

Fig. 4 is a detail elevation upon an enlarged scale, partly in section, on line 4—4 of Fig. 2;

Fig. 5 is an end view taken from the left of Fig. 1, showing a portion in section on line 5—5 of Fig. 1;

Fig. 6 is a detail section on line 6—6 of Fig. 5;

Figure 7:
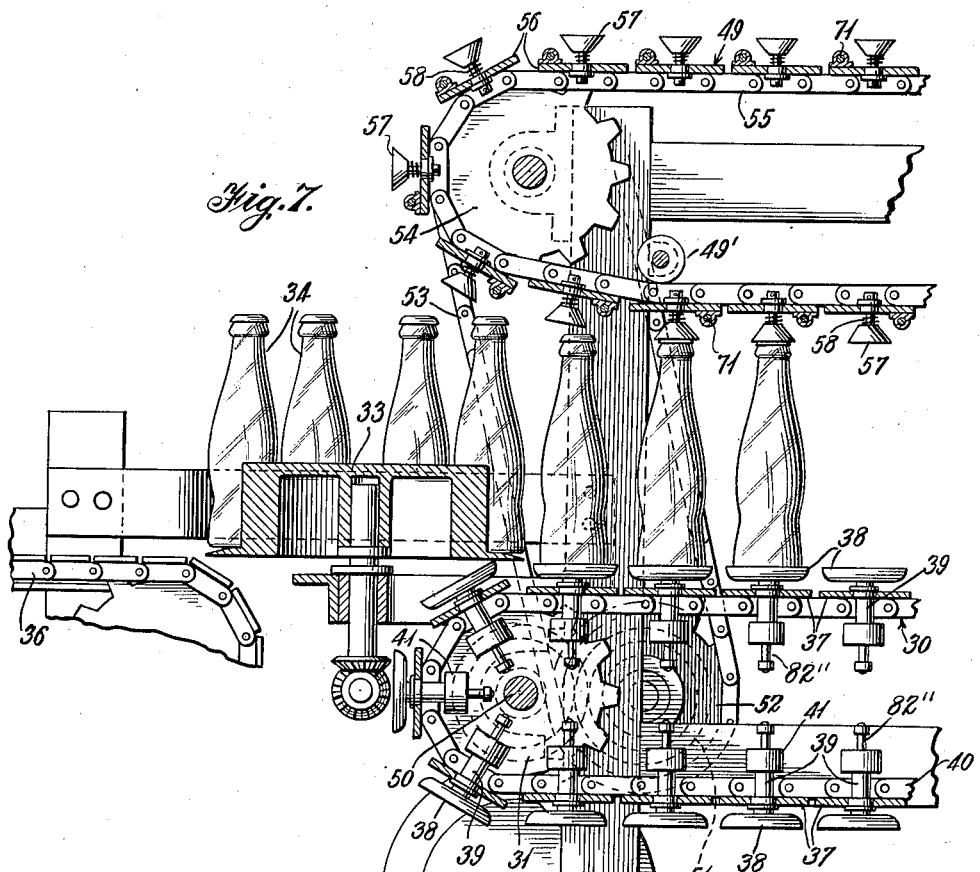
Fig. 7 is a detail vertical section on line 7—7 of Fig. 5.

Figs. 10, 11, 12, and 13 are detail vertical sections taken on the corresponding section lines of Fig. 2, drawn to an enlarged scale;

Fig. 14 is a detail vertical section taken on line 14—14 of Fig. 2, drawn to an enlarged scale;

Fig. 15 is a plan view as seen from line 15 of Fig. 14;

Fig. 16 is a perspective view of a slot plate;

Fig. 17 is a plan view of a different form of apparatus of the invention;

Fig. 18 is a detail vertical section, on an enlarged scale, on line 18—18 of Fig. 17;

Fig. 19 is a detail plan view upon an enlarged scale, showing means for rotating the containers upon their axes;

Figs. 20, 21, 22, and 23 are detail vertical sections, upon an enlarged scale, taken on corresponding section lines of Fig. 17; and Fig. 24 is a diagram of circuits.

As shown in Figures 1 to 16 inclusive, the device comprises an endless conveyor 30 traveling about sprockets 31, 32, which conveyor is intended to carry containers for liquids, as bottles, through the testing machine. To feed the containers to the conveyor 30, there is shown a feed wheel 33 of known form, adapted to receive containers, as 34, in their recesses 35 from an input conveyor 36 and to deliver them individually to the plates 37 of the conveyor 30. This feed wheel is a form of feed at present in general use in bottling and capping machines.

To receive the containers, the plates 37, best shown in Figure 10, carry cups 38 revolubly mounted in the plates 37 by means of a sleeve 39, the plates 37 being shown as mounted upon links of a chain 40 which pass about the sprockets 31 and 32. To cause revolution of the cups 38 and sleeve 39, each sleeve is shown as formed with a drum 41 mounted to come into contact with revolving drums 42, as best shown in Figure 4, which latter drums are of successively increased size and are driven by bevel gears from shaft 43, which in turn is driven by bevel gears 44 by means of motor 45.

It will be seen that the movement of the conveyor will carry any individual drum 41 successively into contact with drums 42 which because of their increased diameters will build up the speed of rotation of the container, it being free to spin between contacts with the drums 42. The conveyor 37 is shown as driven step by step by means of a Geneva wheel 46, Figures 1, 5 and 6, to cause the chain 40 to step at each movement a distance equal to the spacing between the axes of the sleeves 39.

When, by this step by step arrangement, the drum 41 of any individual cup passes the last and largest drum 42, it will be forced between a pair of brake members 47, Figure 4, which are urged toward each other by the resilience of their mountings upon brackets 48, the brake members 47 being lined with material, as leather, adapted to exert friction upon the drum and to stop the revolution of the cup. At this time the contents of the container will be spinning and will continue its spin relative to the container while the latter is held stationary.

To preserve the upright position of the bottles or the like, upon conveyor 30, there is shown a second endless conveyor 49, indicated in Figures 2, and 7, driven from the shaft 50 which drives sprocket 31 by means of gears 51 and sprocket 52, and chain 53, Fig. 7, passing about sprocket 54 about which the chain 55 of conveyor 49 passes. The plates 56 of conveyor 49 mounted upon the links of chain 55 each carry a cup 57 which are revolubly mounted in the plates 56 and are yieldable therein against the pressure of springs 58. The conveyors 37 and 49 are so driven in synchronism that a cup 57 will be pressed upon the cap of each container as the container becomes seated in a cup 38. If desired, the cups 38 may be lined with a friction material 59, Figure 10.

To provide a diagonally downward movement of cups 57, a straight run of the cups through the machine in engagement with the caps of the containers, and a diagonally upward movement of the cups 57 when freeing said caps, idler pulleys 49' and 49" are provided, Figure 2.

To inspect the contents of the container, there is shown an inspection device comprising a light source 60 and condensing lenses 61 contained in a light box 62 which is provided with a slit 63 through which a narrow beam of parallel light is caused to pass through the container 64, Figure 14, to fall upon a camera device 65 which focuses the image of the illuminated portion of the bottle at the point of emergence of the light therefrom upon photo-electric cells 66, 67, 68. For convenience in bringing a definite portion of the image upon the individual photo-electric cells 66—68, there is shown in Figure 14 a series of prisms 69 so located as to very slightly overlap and to account for the entire image. The image could be focused upon a single electric cell but the scheme illustrated is preferred since the different portions of the container may therefore be given preferential treatment. For instance, the image of the neck of the bottle as inverted by the camera 65 will fall upon photo-electric cell 66 and the image of the base of the container upon cell 68.

By mechanism to be described, the effect of a foreign particle in the liquid contained in the container 64 is caused to close an electric circuit through solenoid 70, Figure 11, to thereby move a pin 71, Figure 11, which is mounted upon plate 56 and which will be held in projected position by means of latch 72. A pin is to be provided upon each of the plates 56.

When the pin 71, which has thus been projected, reaches a throw-out station, it strikes a cam 73, Figure 12, which closes a bridge between contacts 74 whereby causing actuation of a solenoid 75, Figure 3, which by its action through rack 76 swings a gate 77 into the path of the bottle to be rejected, which at that time will be upon the out-put feed plate 78, thus causing the bottle which is to be rejected to be switched off onto the rejection conveyor 79.

Figure 8:
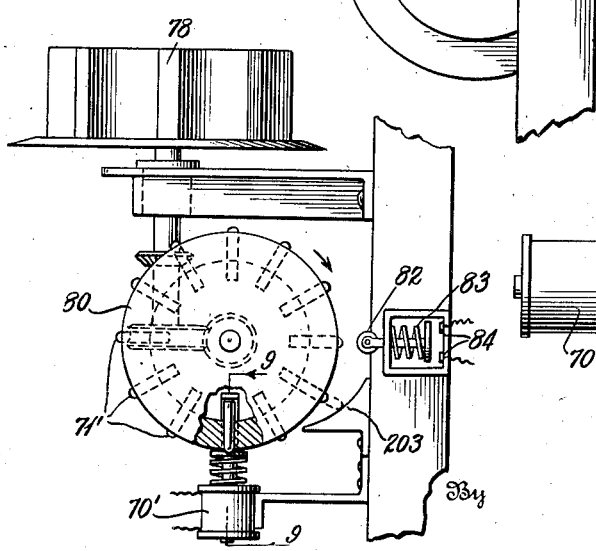
Fig. 8 is a detail elevation of a modified form of reject pins.
Figure 9:
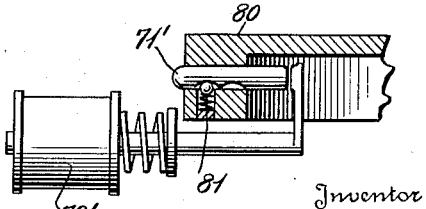
Fig. 9 is a section on line 9—9 of Fig. 8.

An alternative form of rejection pins is shown in Figures 8 and 9, wherein a wheel 80 is shown driven from the output feed plate 78, as by means of bevel gears, the solenoid 70' causing one of the pins 71', carried in the wheel 80, to be moved against detent 81, Figure 9, in such a way as to project from the wheel. The wheel 80 continues to revolve step by step in synchronism with the movements of the conveyor 30, in the direction of the arrow in Figure 8. The movement of the pins from the position opposite the solenoid 70', Figure 8, to the position opposite the roller 82 is equal to the movement of the bottles between the inspection station and the point of rejection so that when the pin 71' assumed to be projected, comes into contact with the pulley 82, the pulley is depressed against spring 83 whereby to cause the contacts 84 to be bridged, thereby energizing solenoid 75 to reject the defective container.

To restore a pin 71 after it has actuated switch 73, 74, Figure 12, a cam 200 is shown in Figures 2 and 13 which may be stationarily mounted in the path of movement of the head of pin 72, so as to draw the pin out of the locking groove 201 in pin 71 to allow spring 202 to restore the pin. In the form of Figure 8, a cam 203 is provided to restore the pins 71' that may be actuated.

It is desirable that the electric valves 154—156, Figure 24, be cut out of action while the bottles are moving relative to the test beam. To this end breaker contacts 204 bridged by arm 205, actuated by cam 206, are shown in Figure 6, which breaker points are in a circuit controlling the electric valve apparatus 154—156, Figure 24. The contacts 125, Figure 17, perform a like function.

To lift the container out of cup 38, there is shown an ejector plate 81" mounted upon a pin 82" projecting through the sleeve 39. When the cup reaches the position wherein the container is to be delivered to the feed plate 78, a cam 83 placed in the path of movement of the lower ends of the pins 82" causes the plate 81" to lift the container above the edge of the cup 38.

The form of the invention shown in Figures 17 to 23 inclusive differs from the form already described in that the containers to be inspected are carried upon a rotating table which is driven with a uniform motion instead of by a step by step motion and in which the inspection device is caused to be stationary, relative to the container under inspection, by moving the light source at the speed of the container during the test and then causing a retrograde movement of the inspection device to pick-up the next container. It also differs from the form first described by the plan of ejection of the containers to be rejected.

As shown, this form of the device comprises a standard or column 84 upon which a disk 85 is mounted to revolve in ball bearings 86, 87 driven through a worm wheel 88 and worm gear 89 by means of motor 90. Carried by the disk 85 are the cups 38' mounted upon sleeves 39' provided with the friction drums 41'. To revolve the containers in this form of the device, there are provided, as shown in Figure 19, belts of frictional material 91, 92, 93 mounted adjacent the periphery of the disk 85, upon the stationary disk 94, Figure 18.

The belt 91 is shown as driven by a motor 95, Figure 23, through reducing gear 96 and belt pulley 97. The belt 92 is driven from belt 91 by means of a sprocket chain 98, and the belt 93 from belt 92 by means of sprocket chain 99, in an obvious manner.

Because of the successively increasing size of the belt pulleys 100, and 101, the belts 92, and 93 will be driven at higher speeds than the belt 91, thereby building up the speed of rotation of the cups 38 and the containers. The containers thus set into rotation to cause revolution of the contents in the container are brought to a stop by means of brakes 47', which brakes are carried by the means which carries the inspection light, to be described.

To support the upper ends of the containers while upon the disk 85, there are shown cups 57' mounted in a ring 102 supported above disk 85 to travel with the disk 85.

The cups 57' are depressed upon the bottles by springs 58' and the cups are lifted against the pressure of springs 58' at the point of input by means of a cam 104, Figure 17, and are again lifted to allow the bottles to be ejected by a like cam 105.

The supports for the cam 104 are shown in Figure 17 at 106, 107 rising from the disk 94. Similar supports for the cam 105 are shown at 108, 109, Figure 17.

The input to the disk 85 is shown at 33' and is in all essential respects similar to the feed plate 33 of the form first described. The output of perfect bottles is indicated at 78' which again is similar to that shown at 78 in the first form of the device.

The feed plates 33' and 78' are shown as driven from the worm wheel 88 through shafts 110, 111, which drive the vertical shafts of said plates through bevel gears in an obvious manner and in synchronism with the movements of the disk 85 and the cups 38'.

The testing light in this form of the apparatus is shown as mounted upon an overhead arm 112, oscillatable about column 84. The light source apparatus 62' is supported from the arm 112 by means of supports 113, 114, and the focusing camera 65' by means of supports 115 and 116.

The enclosure for the photo-electric cells and prisms is shown at 117 carried by the arm 112. To give the arm 112 and its carried parts, movement with the disk 85 while the bottles are under inspection, the disk is shown as carrying a series of ratchet teeth 118 in number equal to the number of the cups 38'.

Mounted in a bracket 119 upon one of the supports 115, is a pin 120, Figures 17 and 20, which is urged downwardly by means of a spring 121.

It will be seen that when pin 120 lies in front of one of the ratchet teeth 118, the arm 112 will be caused to move with the disk against the influence of tension spring 122, Figure 17. To lift the pin 120 out of contact with the successive ratchet teeth 118, there is shown a stationary cam 123, Figure 20, which will allow the pin to slip over the ratchet tooth and be quickly returned into contact with the next ratchet tooth by means of spring 122. A buffer spring 124 is preferably provided to ease the shock of the returning light source.

In Figure 20, there are shown electrical contacts 125 which are used to break the circuit to the electric valve means between the tests so that the test will be applied only when the condition of relative repose between the container and the light source exists.

The form of ejection pins shown in Figure 8 may be applied to this form of the invention, to be driven by worm wheel 88 as indicated at 126, the number of pins between the solenoid 70' and the roller 82 being equal to the number of containers between the inspection station and the point of action of the solenoid 127, so that a pin, which is caused to project by a test of a bottle to be rejected, will reach a point opposite solenoid 127 when the pin has revolved to a position to operate a switch 84'. When the switch 84' is actuated, the solenoid 127 will be given an impulse to quickly draw in its core against spring 128 to cause head 129 to kick the bottle off from the plate 81'.

To lift the bottles free of cups 38' at the point of ejection of both imperfect and perfect bottles, there is shown a cam 83', Figures 17 and 22, which lifts the pins 82' in the manner similar to the actuation of pins 82'' in the first form described. The solenoid 127 is shown as supported by a U-shaped member 130 from the disk 94.

A diagram of circuits for control of the apparatus is shown in Figure 24. In this figure, rays from light source 60 are passed through the condensing lenses and the slit already described, the image at the bottle being focused upon the prisms 69 to the photo-electric cells 66—68.

The power supply to the entire electrical apparatus is by means of a motor generator set 131 shown as comprising an AC power supply 132, driving motor 133, an AC generator 134 to provide current for the amplifying and a portion of the electrical valve apparatus, and a DC generator 135 to provide energy for the light source 60 and for a portion of the electrical valve apparatus. The field of the generator 134 may be energized by coil 136 from the generator 135.

Power supply 137 for the amplifying set is shown as connected to wires 138, 139, with the AC bus wires 140, 141 and high voltage power supply to the amplifying sets 142, 143, 144 is by means of wires 145, 146. Likewise, the power supply to the electric valve apparatus, illustrated diagrammatically at 147, is by means of wires 148, 149, connected to bus wires 140, 141, supplying high voltage through wires 150, 151 and low voltage through wires 152, 153.

The electric valve apparatus indicated diagrammatically at 154, 155, and 156 controls low voltage current from power supply 147 to solenoid 166.

The amplifier sets 142—144 and the electric valve sets 154, 156 are known forms of apparatus and in themselves form no part of the present invention, being obtainable commercially upon the market. The hook-up of these parts is such that current flows through the photo-electric cells in accordance with illumination thereon uniformly so long as the illumination is uniform. This constant current has no effect upon the valve apparatuses, they being affected only by a disturbance of the normally constant current (caused by an impulse from a foreign particle). This dynamic change is amplified by sets 142—144 and operates the electric valve apparatus 154—156.

The nature of the electric valve apparatus is such that no current can flow in wires 161, 162 under normal conditions, but when the impulse reaches the valve apparatus because of some abrupt change in the illumination falling upon one of the photo-electric cells 66—68, the valve control action is removed, the gas in the gaseous tube valve becoming conductive, allowing free flow of current through wires 161, 162.

Assuming that a particle of foreign material in bottle 64 passes through the beam of light from source 60, an impulse would be produced which, amplified by one of the amplifiers 142—144, will cause the valve control to be removed and cause current to flow from wire 140 through wire 148, wire 153, electric valve, say 154, wires 163, 162, switch 125, wire 164, solenoid 166, wires 161, 165, valve 154, wire 152, wire 149, to wire 141, thus energizing solenoid 166 to draw down its switch arm 167, thereby closing a circuit from wire 140 through wire 168, solenoid 70, wire 169, switch 167, wire 170, to wire 141.

The action of solenoid 70 causes a pin 71 or 71' to project, which pin at the proper time closes switch 74 providing a circuit through a slow opening relay 175 to actuate the rejection apparatus by means of solenoid 75 to cause the imperfect bottle to be rejected.

The current to solenoid 75 is from wire 140 through wire 171, wire 172, solenoid 75, wire 173, relay 175, wire 174, to wire 141. The purpose of providing the slow opening relay 175 is to cause the action of solenoid 75 to be sufficiently prolonged to cause proper ejection of the bottle.

In the form of the invention of Figures 17 to 23 inclusive, this relay 175 may be omitted and the solenoid 75' may be actuated directly from switch 74.

The system shown in Figure 24 provides safety apparatus in order to ensure the rejection of all bottles both good and bad in case anything goes wrong with the apparatus. To this end there are shown normally closed circuit relays 176, 177, 178, 179, with their control contacts in series and in series with a master relay 180. It follows therefore that breaking of the circuit through any of the named relays will cause the master relay 180 to close its normally open switch to close a circuit through a resister 181, which would have the effect upon the circuit of solenoid 166 of breaking down of one of the electric valves 154—156. Therefore the solenoid 166 will be continuously energized at all times when switch 204 is closed to cause all bottles to be rejected by action of solenoids 70, and 75, until the defect is restored.

The coils of switches 176, 177, 178, are each in series with the high voltage supply to the amplifying and electric valve apparatus, and solenoid 179 is in series with the filament circuit of the light source 60.

In series with the contacts of switches 176—179 there is also a normally open solenoid switch 182 so that upon the breaking of the safety circuit at any point, the switch 182 will close its circuit to sound an audible alarm 183. In shunt of each of the switches 176—180, there is shown a lamp 184, which lamps are normally short circuited by the closed contacts of these switches respectively, and which will be caused to light when the short circuit is removed by opening of the circuit through any one of these switches. By this means an attendant may immediately go to the source of trouble and remove the difficulty.

The lamps 184 are of a high resistance type, as neon glow lamps, in order that the relay 180 will not be energized when their short circuit is removed.

It will be understood that current flowing through relay 166 by the breaking down of electric valve action will continue to flow until the current is broken at some point in the circuit, as by switch 204, and breaking of such current immediately allows the valve control to be reestablished.

As explained, the operation of the device and method depends upon an abrupt change in illumination of a photo-electric cell and may be operative even tho very slight indeed. Tests show that the device may be made so sensitive as to detect a single particle of dust falling through the light beam. It can therefore be caused to detect particles so small that any usual visual inspection would not discover them. A particle of glass or a bubble of gas in the liquid will, by dispersion of the otherwise parallel rays of the inspecting beam, cause abrupt diminution of illumination and therefore be detected.

If a foreign body, as a chip of glass, becomes wedged in a bottle or jar or be adhering to its interior, it would not be moving with the contents and would not, of itself, be detected. However, in a carbonated liquid, as a beverage, such a stationary particle is found to cause eddy currents in the liquid moving past it, which eddy currents will cause gas bubbles to be released, which bubbles will be detected and cause rejection of the package.

By adjustment of the degree of amplification of impulses, the apparatus may be adjusted as to the minimum size of particle to be detected. Therefore, if the fluid under inspection has radiant energy obstructive particles normally present, the apparatus may be adjusted to detect only foreign bodies of a minimum size greater than the maximum size of the normally present bodies.

Ordinary visual light may be used in most instances for inspection of bottled goods, but any form of radiant energy as infra red, ultra violet, or any other form that may be caused to act upon an equivalent of a photo-electric cell, may be adopted as the circumstances dictate.

It is obvious that the rotation of the contents relative to the container will cause an active mixing of the liquid, particularly when the container is caused to "spin" as described above, and more particularly when the condition as to rotation of the container relative to the spinning liquid is suddenly changed as described.

In the inspection of fluids in bulk, not packaged in containers, it is obvious that the fluid may be led through a conduit having opposite windows for passage of the test beam, and the reject apparatus may take the form of a valve to be momentarily opened to reject a portion of the fluid and to be then immediately and automatically closed.

Minor changes may be made in the steps of the process or in the physical embodiments of the invention within the scope of the appended claims, without departing from the spirit thereof.

I claim:

1. The process of inspecting fluids which comprises: moving the fluid through a beam of radiant energy; detecting abrupt change in intensity of transmitted energy caused by interception of a portion of said energy by the passage of a body of foreign material with the fluid through said beam while a test is being applied.

2. The process of inspecting fluids which comprises: moving the fluid through a beam of radiant energy; detecting abrupt change in intensity of transmitted energy caused by interception of a portion of said energy by the passage of a body of foreign material with the fluid through said beam while a test is being applied by means non-responsive to gradual change of transmitted energy.

3. The process of detecting the presence of foreign bodies in fluids which comprises: moving the fluid through a beam of radiant energy passing to photo-electric material; amplifying electrical impulses caused by abrupt changes in output from said material caused by passage of foreign material through said beam with the fluid while a test is being applied; and detecting said amplified impulses.

4. The process of detecting a foreign body in liquid packaged in a closed container, which comprises: passing a beam of radiant energy through a closed package while holding the container stationary relative to the beam, with the liquid moving through the beam within the container; and detecting electrical impulses caused by abrupt change in intensity of transmitted energy caused by movement of a foreign body into and/or out of said beam.

5. The process of detecting a foreign body in a fluid and rejecting the portion of the fluid containing said body, which comprises: passing a beam of radiant energy through the said fluid to fall upon photo-electric material while said fluid is in motion relative to the beam; amplifying electrical impulses caused by abrupt change in output of said photo-electric material caused by passage of a foreign body into and/or out of said beam; causing said impulses to affect electric valvular control in a circuit to allow current to flow therein and utilizing said current flow to cause rejection of the portion of the fluid containing said foreign body.

6. The process of inspecting packaged liquid for presence of foreign bodies which comprises: subjecting the contents of the package to torque to cause said contents to rotate relative to the container in which they are packaged; passing a beam of radiant energy through the package while the container is stationary relative to the beam and the contents are rotating within the container; and detecting by electrical means an effect upon the radiant energy transmission caused by movement of a foreign body relative thereto.

7. The process of inspecting liquid for presence of foreign bodies which comprises: moving the liquid relative to a beam of radiant energy passing therethrough to fall on photo-electric material to cause the change of condition in presence or absence in said beam of a foreign particle moving with the liquid to cause an electrical impulse in an otherwise substantially uniform flow of a current through said photo-electric material; amplifying said impulse; detecting said amplified impulse to indicate presence of the foreign body; and determining the minimum size of particle to be detected by adjusting the degree of said amplification.

8. The process of inspecting bottled carbonated liquids which comprises: passing a beam of radiant energy through a portion of the bottle to photo-electric material, while said bottle is stationary relative to the beam and the contents of the bottle are rotating therein, whereby to cause a foreign body adhering to the interior of the bottle to cause eddy currents in the liquid, whereby to release gas bubbles from the liquid; and detecting electrical impulses caused by quick changes in current flowing through said photo-electric material as a result of changes of illumination caused by said bubbles.

9. Apparatus of the class described comprising, in combination: radiant energy means to inspect liquid contained in closed packages; means to move the packages to and from a point of inspection; means to prevent relative movement between the package and said first named means during inspection; and means to cause motion of the liquid in the package during inspection.

10. Apparatus of the class described comprising, in combination: radiant energy means to inspect packaged liquid; means to move a package into and out of the field of the first named means; means to prevent relative movement between the package and said field during inspection; means to cause the contents of the package to move relative to the beam during inspection; and means to suspend operation of the inspecting means during relative movement between the inspecting means and the package.

11. Apparatus of the class described comprising, in combination: means to detect the presence of foreign bodies in bottled liquid; means to prevent detection of a foreign body upon the exterior of a bottle from affecting said first named means; means to move bottles of liquid into and out of the field of operation of said detecting means; means responsive to detection of presence of a foreign body in a bottle to cause rejection of that bottle; and means to cause all bottles to be rejected when said detection means becomes inoperative.

12. Apparatus for detecting foreign bodies in fluids comprising, in combination: means to provide a beam of radiant energy; a photo-electric cell exposed to said beam; means to cause the whole of a fluid to be inspected to pass through said beam; means to detect an electrical impulse resulting from an abrupt change in current passing through said cell caused by a body of foreign matter carried into and/or out of said beam by said fluid.

13. Apparatus for detecting foreign bodies in fluids comprising, in combination: means to provide a beam of radiant energy; a photo-electric cell exposed to said beam; means to cause the whole of a fluid to be inspected to pass through said beam; means to detect an electrical impulse resulting from an abrupt change in current passing through said cell caused by a body of foreign matter carried into and/or out of said beam by said fluid; and means to amplify said impulses before detection.

14. Apparatus of the class described, comprising, in combination: a source of radiant energy; a photo-electric cell; means to direct a beam from said source to fall upon said cell; means to interpose a portion only of a package of liquid in the path of said beam; means to cause motion of liquid in the package relative to said beam and to the container portion of said package; means to detect electrical impulses caused by abrupt change of volume of current through said cell caused by change of amount of energy falling on said cell resulting from motion of a foreign particle in said liquid.

15. Apparatus of the class described, comprising, in combination: means to provide a narrow elongated beam of light of a length substantially equal to the height of a container; means to locate a liquid filled container with its axis in said beam; means to divide the image of said beam after passing through said container between a plurality of photo-electric cells; means to cause the contents of the container to revolve about said axis through the beam at least one-half turn during a test; a plurality of electric valve means each responsive to electrical impulses caused by abrupt changes in light falling on the respective cells to allow current to flow in a common circuit when so affected; and means in said circuit to cause rejection of a container having a foreign body in its contained fluid, in response to said current flow.

16. Apparatus of the class described comprising, in combination: means to provide a horizontally thin, vertically wide beam of radiant energy for inspection of containers; a conveyor; a plurality of holders for containers revolubly mounted on said conveyor whereby to move containers to be inspected into and out of position with their vertical axes in said beam; means to cause revolution of said holders and carried containers; means to stop said revolution when the container is in said beam to cause revolution of the contents of the containers; and step by step drive means for said conveyor acting to cause said containers to be momentarily stationary relative to said beam during inspection.

17. Apparatus of the class described comprising, in combination: means to provide a thin, wide beam of radiant energy for inspection of containers; a conveyor; a plurality of holders for containers revolubly mounted on said conveyor whereby to move containers to be inspected into and out of position with their axes in said beam; means to cause revolution of said holders and carried containers; means to stop said revolution when the container is in said beam to cause revolution of the contents of the containers relative thereto; step by step means to cause said containers to be momentarily stationary relative to said beam during inspection; and means set into action by passage of a foreign body in a liquid in a container through said beam, acting to reject that container.

18. Apparatus of the class described comprising, in combination: an endless conveyor; means revolubly mounted on said conveyor to receive bottles to be inspected; means mounted to move above bottles carried by said conveyor; cap means revolubly carried by said last named means to engage the upper ends of bottles traveling on said conveyor to preserve a vertical position of the bottles; means to drive said conveyor and said second named means in synchronism; means to cause revolution of said bottle receiving means; means to stop revolution of the bottle to cause revolution of the contents of the bottle relative to the bottle; and means to inspect bottles while stationary with the contents revolving.

19. Apparatus of the class described comprising, in combination: a rotary disk-type conveyor; a plurality of bottle holding means revolubly mounted on said conveyor; means mounted adjacent the path of movement of bottles on the conveyor to cause gradually accelerated revolution of said bottle receiving means; means to stop revolution of the bottle to cause revolution of the contents of the bottle relative to the bottle; means to inspect bottles carried by said receiving means while the bottles are stationary and the contents revolving; means to respectively feed bottles to and to remove bottles from said conveyor; and additional means to remove bottles from said conveyor responsive to detection of foreign matter carried by a bottle by said inspection means.

20. Apparatus of the class described comprising, in combination: a rotary disk-type conveyor; a plurality of bottle-holding means revolubly mounted on said conveyor; cap-carrying means supported by said conveyor, spaced thereabove to travel therewith; a plurality of centering caps carried by said cap-carrying means in registry with the respective bottle holding means; means to mount said caps for revolution in said cap-carrying means and for upward yielding against spring pressure therein; respective means to feed bottles to said holding means and to remove the same therefrom; means respectively to raise said caps above bottles when fed to the holding means and when to be removed therefrom; means to cause revolution of said holding means; and means to inspect bottles carried by said conveyor.

21. Apparatus of the class described comprising, in combination: a rotary disk-type conveyor; means carried thereby to hold bottles to be inspected; means to rotate said conveyor with continuous movement; inspecting means to project a beam of radiant energy through bottles moving on said conveyor; means to mount said inspecting means for oscillation about the axis of said conveyor; and means to move said inspection device in one direction of oscillation with and at the speed of a bottle and to provide quick return in the opposite direction into registry with the succeeding bottle.

22. Apparatus of the class described comprising, in combination: a rotary disk-type conveyor; a plurality of bottle-holding means revolubly mounted on said conveyor each presenting a cylindrical element adjacent the edge of the conveyor; a plurality of belts mounted to move in contact with said elements to cause revolution of said holding means; and means to drive the respective belts at successively greater speeds to build up the speed of rotation of the holding means.

23. Apparatus of the class described comprising, in combination: a rotary disk-type conveyor; a plurality of bottle-holding means revolubly mounted on said conveyor each presenting a cylindrical element adjacent the edge of the conveyor; a plurality of belts mounted to move in contact with said elements to cause revolution of said holding means; means to drive the respective belts at successively greater speeds to build up the speed of rotation of the holding means; means mounted to oscillate about the axis of said conveyor; means carried by said oscillating means to inspect bottles carried by said conveyor; and means carried by said oscillating means to stop rotation of said holding means whereby to cause rotation of the contents of the bottles relative thereto.

24. Apparatus of the class described comprising, in combination: a conveyor; a plurality of sleeves revolubly mounted on said conveyor; bottle receiving means carried by each sleeve; a friction drum carried by each sleeve; driven friction means mounted adjacent the path of movement of said conveyor to engage said drums successively as the conveyor moves to cause revolution of the bottles; an inspection station; and brake means mounted adjacent the path of movement of said conveyor to engage said drums successively at the inspection station to prevent revolution of the bottles during inspection.

25. The process of inspecting bottled liquid which comprises: passing a narrow elongated beam of radiant energy through the longitudinal axis of a bottle of liquid while the bottle is stationary and the liquid is rotating therein; causing respective portions of said beam after passing through unlike portions of the bottle to fall upon respective photoelectric cells; amplifying electrical impulses caused by change in transmitted energy as a result of a foreign particle in any of said portions affecting the current flowing through one of said cells; detecting such foreign particle by means of an amplified impulse; and relatively adjusting the amplification of the respective circuits to determine the delicacy of response to tests upon the respective unlike portions.

26. The process of inspecting packaged liquid which comprises: causing rotation of the contents of the container by rotating the latter, and relative rotation between the contents and the container by sudden change in the condition as to rotation of the latter; passing a beam of radiant energy through the package while such relative rotation exists; detecting by electrical means an effect upon the radiant energy transmission caused by movement of a foreign body with the liquid relative to said beam while eliminating effect upon the electrical means of container-carried, energy-transmission-modifiers by said difference of rotational condition between container and liquid.

27. The process of inspecting packaged liquid which comprises: preparing for inspection by causing rotation of the contents of the container by rotating the latter; causing relative rotation between the contents and the container by sudden change in the condition as to rotation of the latter thereby also mixing the liquid; passing a beam of radiant energy through the package while such relative rotation exists; detecting by electrical means an effect upon the radiant energy transmission caused by movement of a foreign body with the liquid relative to said beam while eliminating effect upon the electrical means of container-carried, energy-transmission-modifiers by said difference of rotational condition between container and liquid.

GEORGE PHILIP STOUT.